(12) United States Patent
Cha et al.

(10) Patent No.: US 9,174,581 B2
(45) Date of Patent: Nov. 3, 2015

(54) DOOR STEP DEVICE FOR VEHICLE

(71) Applicant: Hyundai Motor Company, Seoul (KR)

(72) Inventors: Dong Eun Cha, Suwon-si (KR); Hyun Gyung Kim, Hwaseong-si (KR); Seung Mok Lee, Osan-si (KR); Phil Jung Jeong, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 186 days.

(21) Appl. No.: 13/974,521

(22) Filed: Aug. 23, 2013

(65) Prior Publication Data
US 2014/0333042 A1 Nov. 13, 2014

(30) Foreign Application Priority Data

May 7, 2013 (KR) .................. 10-2013-0051510

(51) Int. Cl.
*B60R 3/02* (2006.01)
(52) U.S. Cl.
CPC ......................................... *B60R 3/02* (2013.01)
(58) Field of Classification Search
CPC .............. B60R 3/00; B60R 3/002; B60R 3/02
See application file for complete search history.

(56) References Cited

U.S. PATENT DOCUMENTS

| 1,474,257 | A | * | 11/1923 | Harrison et al. | ............... | 105/430 |
|---|---|---|---|---|---|---|
| 6,135,472 | A | * | 10/2000 | Wilson et al. | ................. | 280/166 |
| 7,469,916 | B2 | * | 12/2008 | Watson | ........................ | 280/166 |
| 7,513,565 | B2 | * | 4/2009 | Watson | ........................ | 296/199 |
| 7,900,944 | B2 | * | 3/2011 | Watson | ........................ | 280/166 |
| 8,714,575 | B2 | * | 5/2014 | Watson | ........................ | 280/166 |
| 8,870,208 | B2 | * | 10/2014 | Cha et al. | ....................... | 280/166 |
| 2010/0320715 | A1 | | 12/2010 | Watson | | |
| 2012/0018975 | A1 | | 1/2012 | Salmon et al. | | |
| 2012/0030886 | A1 | * | 2/2012 | Persson et al. | .................. | 14/71.1 |

FOREIGN PATENT DOCUMENTS

| JP | 5-86694 U | 11/1993 |
|---|---|---|
| KR | 1997-0036985 A | 7/1997 |
| KR | 10-2004-0034241 A | 4/2004 |
| KR | 20-0351311 U | 5/2004 |
| KR | 10-2005-0113960 A | 12/2005 |
| KR | 20-2011-0005242 U | 5/2011 |

* cited by examiner

*Primary Examiner* — Katy M Ebner
(74) *Attorney, Agent, or Firm* — Morgan, Lewis & Bockius LLP

(57) ABSTRACT

A door step device for a vehicle includes: a step panel; a rack gear part which extends from the step panel and has a locking groove formed at a side thereof; a pinion gear part which gear-meshed with the rack gear part, and rotates by power from a driving motor; a tilting operation part including a projection pin and a solenoid adjusting a projected amount of the projection pin; and a control unit which controls the driving motor at the time of the operation of the step panel to draw the rack gear part and controls the solenoid to tilt the rack gear part and the step panel to the ground.

9 Claims, 3 Drawing Sheets

DOOR STEP DEVICE FOR VEHICLE

CROSS REFERENCE TO RELATED APPLICATION

The present application claims priority of Korean Patent Application Number 10-2013-0051510 filed May 7, 2013, the entire contents of which application is incorporated herein for all purposes by this reference.

BACKGROUND OF INVENTION

1. Field of Invention

The present invention relates to a door step device for a vehicle capable of offering improved convenience when passengers get in and out of a vehicle by providing a footboard between a vehicle floor and the ground.

2. Description of Related Art

In general, a recreational vehicle (RV) and some of the commercial vehicles has a footboard installed between the ground and a vehicle floor so as to offer improved convenience when passengers get in and out of a vehicle. Further, even in the case of a vehicle having a high ground clearance, a footboard is installed under a door due to inconvenience when passengers get in and out of a vehicle.

Since the footboard generally fixed to a vehicle frame by a welding or a bolt protrudes to the outside regardless of whether a passenger use the footboard, a passenger who does not use the footboard may be hindered at the time of getting in and out of a vehicle and a quality of an appearance design of a vehicle may be degraded. In addition, since the footboard protrudes to the outside, the footboard is bumped into pedestrians and structures outside a vehicle, such that a vehicle may be damaged or stability of a vehicle may be degraded.

Meanwhile, according to the related art, the footboard mounted at the vehicle door is fixed to the vehicle floor, and thus a height of the footboard may not be adjusted. Therefore, in the case of a vehicle of which the footboard is at a high position, passengers having a short height, such as a child, have inconvenience of using the footboard and in the case of a vehicle of which the footboard is at a low position, the footboard is bumped into protruding objects on the ground when a vehicle drives a rough road or an unpaved road, such that the footboard may be damaged.

Therefore, a need exists for a technology of adjusting the height of the footboard mounted in the vehicle and operating the footboard according to whether passengers use the footboard.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a door step device for a vehicle capable of adjusting a height of a footboard in consideration of a height of a passenger and operating the footboard according to whether the passenger uses the footboard to improve the use convenience of the footboard.

According to various aspects of the present invention, there is provided a door step device for a vehicle, including: a step panel; a rack gear part which extends from the step panel to be inserted into the vehicle and has a locking groove formed at a side thereof; a pinion gear part which is mounted in the vehicle through a rotating shaft, gear-meshed with the rack gear part, and rotates by power from a driving motor; a tilting operation part including a projection pin projecting at a point spaced backwardly at a predetermined distance from the pinion gear part in the vehicle to be locked to the locking groove of the rack gear part so as to provide a rotating center of the rack gear part and a solenoid adjusting a projected amount of the projection pin; and a control unit which controls the driving motor at the time of the operation of the step panel to draw the rack gear part and controls the solenoid to tilt the rack gear part and the step panel to the ground.

The step panel may be provided with a detection sensor which detects objects located within a drawing range and a tilting range.

The step panel may be mounted to be tilted upwardly from a lower side of the vehicle at a predetermined angle and as the projection pin is locked to the locking groove of the rack gear part to tilt the rack gear part downwardly, the step panel may face the ground to be changed to a footboard shape.

The rack gear part may be located under the pinion gear part, such that an upper surface of a front end of the rack gear part is gear-meshed with the pinion gear part and a rear end thereof is inserted into the vehicle.

An inside of the vehicle may be provided with a guide to enclose the side of the rack gear part and rotate along with the rack gear part and the rack gear part may be mounted in a vehicle body by the guide.

The driving motor may be a motor which normally or reversely rotates and has a controllable rotational speed and the control unit may control the power of the driving motor to be reduced when the step panel is tilted to the ground to reduce a tilting speed of the step panel.

The control unit may control the projection pin of the tilting operation part to be separated from the locking groove of the rack gear part when the rack gear part and the step panel may be tilted to the ground to draw the rack gear part and the step panel to the ground in the state in which the rack gear part and the step panel are tilted.

The locking groove of the rack gear part may include a middle groove part for performing the tilting operation of the rack gear part and a back groove part for fixing the rack gear part drawn to the ground in the state in which the rack gear part is tilted.

When the rack gear part and the step panel are drawn to the ground in the state in which the rack gear part and the step panel are tilted, the control unit may operate the solenoid to control the projection pin to be inserted into the back groove part.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
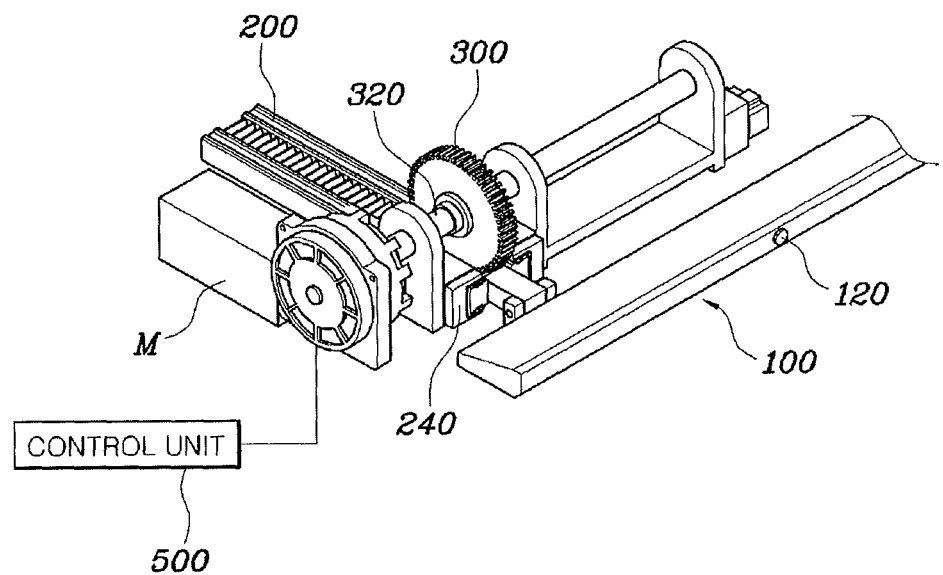
FIG. 1 is a front view of an exemplary door step device for a vehicle according to the present invention.
Figure 2:
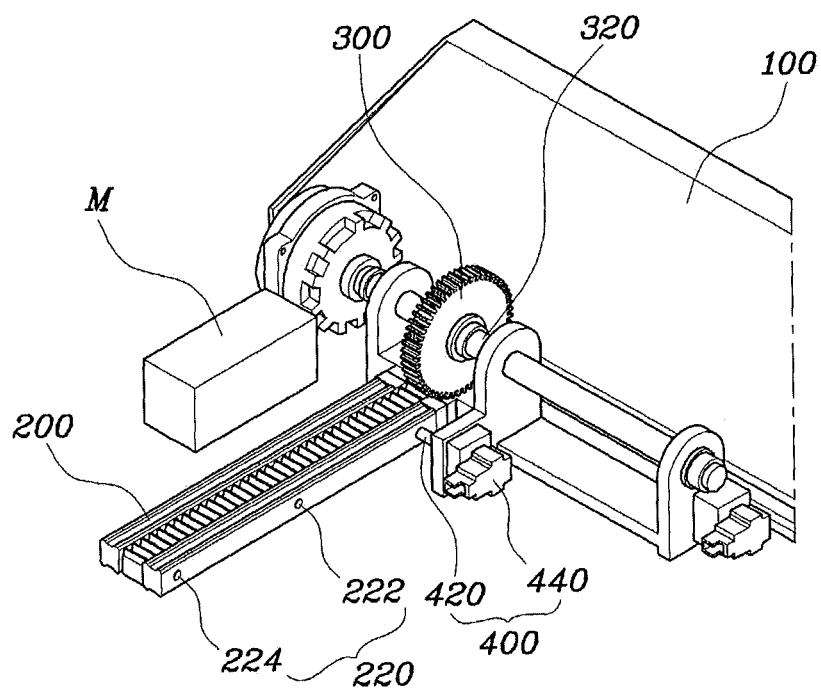
FIG. 2 is a back view of the door step device for a vehicle illustrated in FIG. 1.

FIG. 1 is a front view of a door step device for a vehicle according to various embodiments of the present invention and FIG. 2 is a back view of the door step device for a vehicle illustrated in FIG. 1.

The door step device according to various embodiments of the present invention may include a step panel 100; a rack gear part 200 which extends from the step panel 100 to be inserted into the vehicle and has a locking groove 220 formed at a side thereof; a pinion gear part 300 which is mounted in the vehicle through a rotating shaft 320, gear-meshed with the rack gear part 200, and rotates by power from a driving motor M; a tilting operation part 400 which is configured of a projection pin 420 projecting at a point spaced backwardly at a predetermined distance from the pinion gear part 300 in the vehicle to be locked to the locking groove 220 of the rack gear part 200 so as to provide a rotating center of the rack gear part 200 and a solenoid 440 adjusting a projected amount of the projection pin 420; and a control unit 500 which controls the driving motor M at the time of the operation of the step panel 100 to draw the rack gear part 200 and controls the solenoid 440 to tilt the rack gear part 200 and the step panel 100 to the ground.

Hereinafter, each component of various embodiments of the present invention will be described below in detail. The step panel 100 serves as a footboard when passengers get in and out of a vehicle and may be applied to a side step which is variously mounted in various kinds of vehicles, such as a RV vehicle, a general car, and the like, and may also be applied to a stepped footboard which is mounted in a large-sized vehicle.

The step panel is mounted under a door D without protruding to an outside of a vehicle body. In this case, the step panel is changed to serve as a footboard by protruding to the outside of the vehicle body by a mechanical operation of a rack gear part 200, a pinion gear part 300, and a tilting operation part 400 which will be described below in detail and then being tilted.

Describing the mechanical structure for drawing and tilting the step panel 100, the rack gear part 200 which extends from the step panel 100 to be inserted into a vehicle and has a locking groove 220 formed at a side thereof is rotatably mounted at the vehicle floor and the pinion gear part 300 which is mounted in a vehicle through the rotating shaft 320 and gear-meshed with the rack gear part 200 is mounted. In this case, the driving motor M connected to the rotating shaft 320 to provide power is mounted and as the power of the driving motor M is transmitted to the pinion gear part 300 through the rotating shaft 320, the pinion gear part 300 rotates to draw the rack gear part 200.

As the rack gear part 200 is drawn, the step panel 100 protrudes from the vehicle body and the projection pin 420 of the tilting operation part 400 is inserted into the locking groove 220 of the rack gear part 200 to limit the drawing of the rack gear part 200 and provide a rotating center, such that as the rack gear part 200 rotates, the step panel 100 rotates toward the ground. In this case, the rack gear part 200 is tilted at a predetermined angle based on a point to which the projection pin 420 is locked, in the state in which the rack gear part 200 is gear-meshed with the pinion gear part 300. Herein, when the rack gear part 200 excessively rotates, as a load between the pinion gear part 300 and the rack gear part 200 increases, each gear part may be damaged, such that the control unit 500 stores an appropriate rotation amount of the pinion gear part 300 and controls the driving motor M based on the rotation amount.

As described above, as the driving motor M is operated by the control of the control unit 500, the pinion gear part 300 rotates and the rack gear part 200 gear-meshed therewith is drawn and when the rack gear part 200 is drawn by an appropriate amount, the projection pin 420 projected by the solenoid 440 is locked to the locking groove 220 of the rack gear part 200 to provide the rotating center.

Therefore, the projection pin 420 is inserted into the locking groove 220 to limit the drawing operation of the rack gear part 200 and as the pinion gear part 300 rotates, the rack gear part 200 rotates based on a point to which the projection pin 420 is locked, such that the step panel 100 is tilted and moves to the ground.

As such, the tilting operation of the step panel 100 controls the driving motor M and the solenoid 440 based on the revolutions per minute of the driving motor M stored in the control unit 500 and the projection control timing of the projection pin 420, thereby preventing a mechanical collision and a mechanism error.

Meanwhile, the step panel 100 may be provided with a detection sensor 120 which detects objects located within a drawing range and a tilting range. Herein, the detection sensor 120 may be a sensing unit capable of confirming proximate objects, such as an infrared sensor, an ultrasonic senor, a geomagnetic sensor, and the like. A plurality of detection sensors 120 may be mounted at a bottom portion and a front end portion of the step panel 100 and are configured to detect objects and persons which are located within the drawing range and the tilting range of the step panel 100.

Herein, the drawing range of the step panel 100 means a protruding distance of the step panel 100 from the vehicle body as the rack gear part 200 is drawn and the detection sensor 120 installed in the step panel 100 detects persons, vehicles, walls, and objects within the drawing range and when the detection sensor 120 detects obstacles, the drawing of the step panel 100 is limited. As a result, it is possible to prevent a person from being injured due to the drawing of the step panel 100 or the step panel 100 from being damaged due to the obstacles. Meanwhile, the tilting range of the step panel 100 means a range in which the step panel 100 rotates toward the ground due to the projection pin 420 locked to the rack gear part 200. In this case, the detection sensor 120 detects obstacles located within the tilting range. When the obstacles are detected within the tilting range of the step panel 100, the rotating operation of the step panel 100 is limited. Therefore, even though the step panel 100 is caught at obstacles to limit the rotation of the step panel 100, it is possible to prevent parts from being damaged due to the excessive operation of the step panel 100.

As described above, when the detection sensor 120 detects objects within the drawing range and the tilting range of the step panel 100, the control unit 500 may control the driving motor M and the solenoid 440 to return the step panel 100 to an initial position.

Meanwhile, the step panel 100 is mounted to be tilted upwardly from a lower side of the vehicle at a predetermined angle and as the projection pin 420 is locked to the locking groove 220 of the rack gear part 200 to tilt the rack gear part 200 downwardly, the step panel 100 may face the ground to be changed to a footboard shape.

Figure 3:
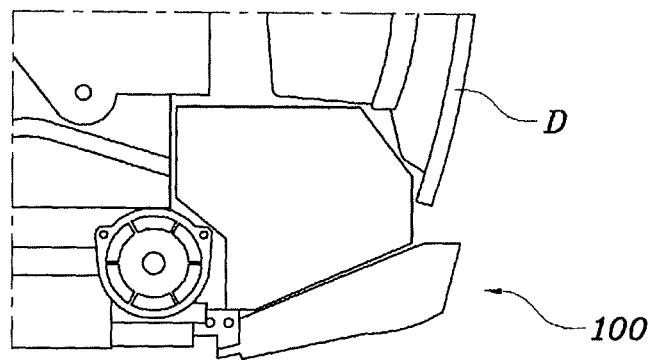
FIGS. 3, 4, 5 and 6 are diagrams illustrating drawing and tilting operations of the door step device for a vehicle illustrated in FIG. 1.

As illustrated in FIG. 3, the step panel 100 may be mounted under the door D to be tilted upwardly from a lower side of the vehicle at a predetermined angle. According to various embodiments of the present invention, as the step panel 100 is drawn and tilted to be changed to a footboard shape, the step panel 100 may be mounted to be tilted upwardly at a predetermined angle as much as the rotating angle of the rack gear part 200. That is, the step panel 100 is mounted upwardly to be tilted by the rotating angle of the rack gear part 200, such that when the rotation of the rack gear part 200 is completed, the step panel 100 may level to face the ground.

As such, the step panel 100 is mounted under the door D in the state in which the step panel 100 is tilted upwardly at a predetermined angle. Therefore, according to various embodiments of the present invention, the rack gear part 200 performs the drawing and rotating operations, such that the step panel 100 may level to face the ground and the appearance design may be improved.

Meanwhile, as can be appreciated from FIGS. 1 and 2, the rack gear part 200 is located under the pinion gear part 300, such that an upper surface of a front end of the rack gear part 200 may be gear-meshed with the pinion gear part 300 and a rear end thereof may be inserted into a vehicle.

FIG. 2 illustrates that as the initial state of the door D step device according to various embodiments of the present invention, the front end of the rack gear part 200 is connected to the step panel 100 and a lower end thereof is inserted into a vehicle. In this case, an upper portion of the rack gear part 200 is formed to have a gear structure, such that the upper portion of the rack gear part 200 may be configured to be gear-meshed with the pinion gear part 300.

Further, various embodiments of the present invention may be implemented even by having the rack gear part 200 be mounted on the pinion gear part 300, but as the rack gear part 200 is mounted on the pinion gear part 300, the pinion gear part 300 may protrude to the vehicle floor, such that the pinion gear part 300 is mounted on the rack gear part 200 and is inserted into the vehicle body, thereby making a layout good and an appearance clear. Further, a design may be made to prevent a vehicle from being damaged due to the rack gear part 200 penetrating through the vehicle body at the time of a side collision of a vehicle.

Meanwhile, the inside of the vehicle is provided with a guide 240 to enclose the side of the rack gear part 200 and rotate along with the rack gear part 200 and the rack gear part 200 may be may be mounted in the vehicle body by the guide 240.

In this case, the guide 240 is to mount the rack gear part 200 in the vehicle body and is rotatably mounted in the vehicle body to rotate along with the rack gear part 200. Further, the rack gear part 200 may be slid back and forth in the guide 240 and the guide 240 may be formed to have an opened upper surface so as to have the pinion gear part 300 and the rack gear part 200 gear-meshed with each other.

Due to the mounted guide 240, the rack gear part 200 may be stably fixed to the vehicle body in the state in which the rack gear part 200 is gear-meshed with the pinion gear part 300.

Meanwhile, the driving motor M is a motor which may normally or reversely rotate and have a controllable rotational speed and the control unit 500 controls the power of the driving motor M to be reduced when the step panel 100 is tilted to the ground, thereby reducing the tilting speed of the step panel 100.

As such, the power of the driving motor M is reduced before the tilting of the step panel 100 is completed, such that as a rotational speed of the pinion gear part 300 is reduced, the tilting speed of the step panel 100 may be delayed to ensure the high quality of tilting operation.

The step panel 100 serves as a footboard by being drawn and tilted and when passengers get in a vehicle, the position of the step panel 100 returns originally. To this end, the step panel 100 may be changed to an initial position by reversely rotating the motor.

Meanwhile, the control unit 500 controls the projection pin 420 of the tilting operation part 400 to be separated from the locking groove 220 of the rack gear part 200 when the rack gear part 200 and the step panel 100 are tilted to the ground to draw the rack gear part 200 and the step panel 100 to the ground in the state in which the rack gear part 200 and the step panel 100 are tilted.

Further, the locking groove 220 of the rack gear part 200 may be configured of a middle groove part 222 for performing the tilting operation of the rack gear part 200 and a back groove part 224 for fixing the rack gear part 200 drawn to the ground in the state in which the rack gear part 200 is tilted.

Further, when the rack gear part 200 and the step panel 100 are drawn to the ground in the state in which the rack gear part 200 and the step panel 100 are tilted, the control unit 500 operates the solenoid 440 to control the projection pin 420 to be inserted into the back groove part 224.

In detail, as described above, the control unit 500 operates the driving motor M to draw the rack gear part 200 and controls the projected amount of the projection pin 420 of the solenoid in the locking groove 220 of the drawn rack gear part 200 to lock the projection pin 420 to the locking groove 220 of the rack gear part 200 to rotate the rack gear part 200. As the rack gear part 200 rotates, the step panel 100 is tilted to the ground to form a footboard shape. In this state, after the projection pin 420 of the tilting operation part 400 is separated from the locking groove 220 of the rack gear part 200, the driving motor M is operated again to additionally draw the rack gear part 200 to the ground.

In this case, the locking groove 220 of the rack gear part 200 is formed by being divided into the middle groove part 222 and the back groove part 224, in which the middle groove part 222 provides a rotation central point of the rack gear part 200 and is to limit the drawing of the rack gear part 200 and when the drawing of the rack gear part 200 is completed in the state in which the rack gear part 200 is tilted, the back groove part 224 is to fix the rack gear part 200. As such, the middle groove part 222 formed in the rack gear part 200 is axially formed in plural to adjust the drawn amount of the step panel 100.

As described above, as the rack gear part 200 is additionally drawn to the ground in the state in which rack gear part 200 rotates, the step panel 100 may move to the ground to adjust the height between the step panel 100 and the ground. As such, since the door step device adjusts the height of the step panel 100 in consideration of a body type of passengers, such as a child or an adult, and the like, passengers may conveniently use the step panel 100, and thus the convenience of the passengers may be more improved.

Figure 4:
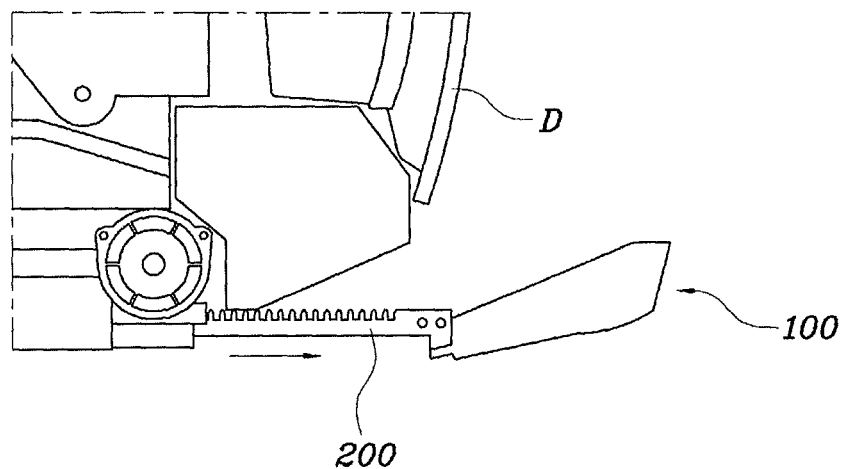
Figure 5:
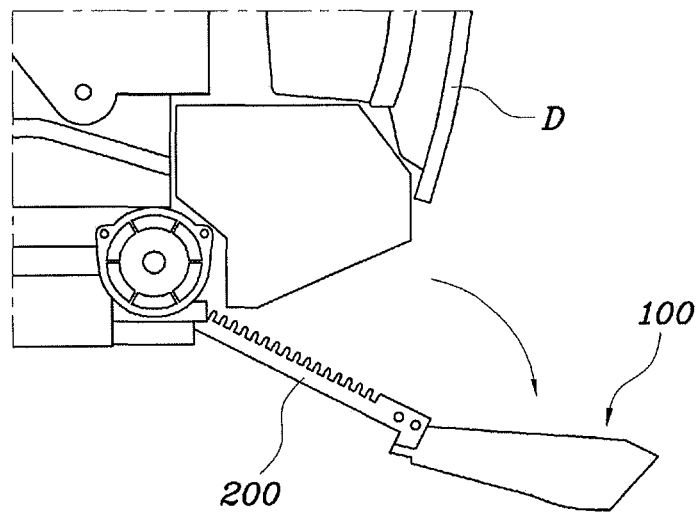
Figure 6:
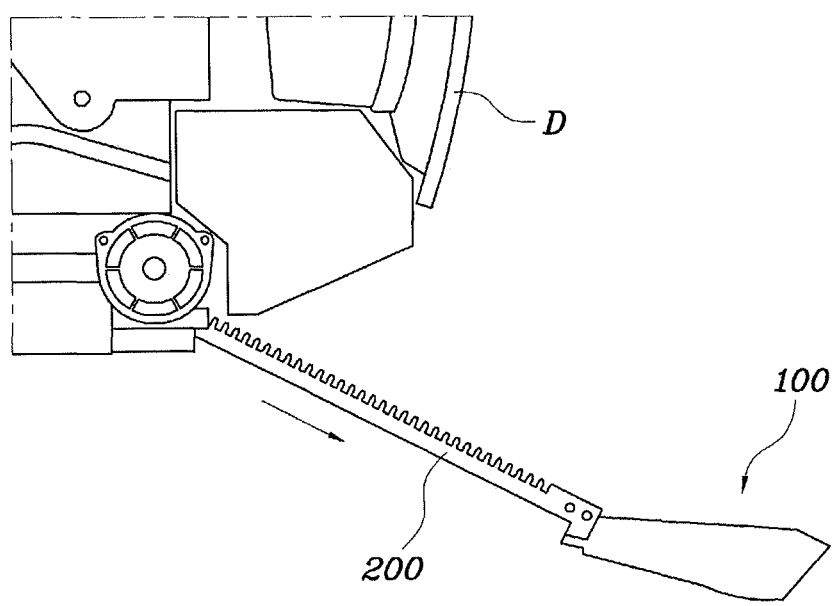

FIGS. 3 to 6 are diagrams illustrating the drawing and tilting operations of the door step device for a vehicle illustrated in FIG. 1. Describing the operation of the door step device for a vehicle according to various embodiments of the present invention, FIG. 3 illustrates the initial state in which the step panel 100 does not protrude to the outside of the vehicle body, as the state in which the step panel 100 is located under the door D. In this state, when passengers intend to get on a vehicle, the driving motor M is operated as illustrated in FIG. 4, the step panel 100 is drawn along with the rack gear part 200. As in the state in which the rack gear part 200 is drawn, the projection pin 420 of the tilting operation part 400 is locked to the middle groove part 222 of the rack gear part 200 to limit the drawing of the rack gear part 200 and provide the rotation central point, the rack gear part 200 rotates as illustrated in FIG. 5, and thus the step panel 100 rotates toward the ground.

When the tilted step panel 100 needs to be additionally drawn, the control unit 500 controls the projection pin 420 to be separated from the middle groove part 222, such that the rack gear part 200 may be drawn to the ground while keeping the state in which the rack gear part 200 rotates As the projection pin 420 is locked to the back groove part 224 formed at the back portion of the rack gear part 200 to limit the movement of the rack gear part 200 moving to the ground, the drawing of the step panel 100 is limited and the position of the step panel 100 is fixed, such that the step panel 100 serves as a footboard.

For the control, the control unit 500 stores the sliding time of the rack gear part, the revolutions per minute of the driving motor M, and the control time of the solenoid of the tilting operation part to sequentially draw and tilt the step panel and additionally draw the step panel in the state in which the step panel is tilted.

As set forth above, according to various embodiments of the present invention, the door step device for a vehicle having the above-mentioned structure can perform the operation of drawing and tilting the step panel and if necessary, additionally draw the step panel in the state in which the step panel is tilted, thereby adjusting the height of the step panel and implementing the high quality of operation performance.

Further, the footboard can be operated according to whether the passengers use the footboard and operated to be drawn when the step panel is required, thereby improving the use convenience of the step panel.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door step device for a vehicle, comprising:
    a step panel;
    a rack gear part extending from the step panel to be inserted into the vehicle and having a locking groove formed at a side thereof;
    a pinion gear part mounted on the vehicle through a rotating shaft, and gear-meshed with the rack gear part, wherein the pinion gear part rotates by power from a driving motor;
    a tilting operation part including a projection pin projecting at a point spaced a predetermined distance rearward of the pinion gear part in the vehicle to be locked to the locking groove of the rack gear part to provide a rotating center of the rack gear part, the tilting operation part further including a solenoid adjusting a projected amount of the projection pin; and
    a control unit which controls the driving motor to draw the rack gear part and controls the solenoid to project the projection pin into the locking groove of the drawn rack gear part, thus enabling the rack gear part and the step panel to be tilted about the projection pin toward a ground.

2. The door step device for the vehicle of claim 1, wherein the step panel is provided with a detection sensor which detects objects located within a drawing range and a tilting range.

3. The door step device for the vehicle of claim 1, wherein the step panel is mounted to be tilted upwardly from a lower side of the vehicle at a predetermined angle and as the projection pin is locked to the locking groove of the rack gear part and the rack gear part is tilted downwardly, the step panel rotates toward the ground to serve as a footboard.

4. The door step device for the vehicle of claim 1, wherein the rack gear part is located under the pinion gear part, such that an upper surface of a front end of the rack gear part is gear-meshed with the pinion gear part and a rear end thereof is inserted into the vehicle.

5. The door step device for the vehicle of claim 1, wherein a vehicle body is provided with a guide to enclose the side of the rack gear part and rotate along with the rack gear part and the rack gear part is mounted in the vehicle body by the guide.

6. The door step device for the vehicle of claim 1, wherein the driving motor is a motor which normally or reversely rotates and has a controllable rotational speed and the control unit controls the power of the driving motor to be reduced when the step panel is tilted to the ground to reduce a tilting speed of the step panel.

7. The door step device for the vehicle of claim 1, wherein the control unit controls the projection pin of the tilting operation part to be separated from the locking groove of the rack gear part when the rack gear part and the step panel are tilted to the ground to draw the rack gear part and the step panel to the ground in a state in which the rack gear part and the step panel are tilted downwardly toward the ground.

8. The door step device for the vehicle of claim 7, wherein the locking groove of the rack gear part includes a middle groove part for performing the tilting operation of the rack gear part and a back groove part for fixing the rack gear part drawn to the ground in the state in which the rack gear part is tilted downwardly toward the ground.

9. The door step device for the vehicle of claim 8, wherein when the rack gear part and the step panel are drawn to the ground in the state in which the rack gear part and the step panel are tilted downwardly toward the ground, the control unit operates the solenoid to control the projection pin to be inserted into the back groove part.

* * * * *